(12) United States Patent
Kim et al.

(10) Patent No.: US 7,679,315 B2
(45) Date of Patent: Mar. 16, 2010

(54) SYSTEM FOR IDENTIFICATION OF GENUINE BATTERY PRODUCT IN MOBILE DEVICE

(75) Inventors: Tae il Kim, Gwangmyeong-si (KR); Ju-Hwan Baek, Anyang-si (KR)

(73) Assignee: LG Chem, Ltd. (KR)

( * ) Notice: Subject to any disclaimer, the term of this patent is extended or adjusted under 35 U.S.C. 154(b) by 936 days.

(21) Appl. No.: 11/473,718

(22) Filed: Jun. 23, 2006

(65) Prior Publication Data
US 2007/0072014 A1    Mar. 29, 2007

(30) Foreign Application Priority Data
Jun. 25, 2005    (KR) .................. 10-2005-0055358

(51) Int. Cl.
*H02J 7/00* (2006.01)
(52) U.S. Cl. .................. 320/106; 320/114; 320/127
(58) Field of Classification Search .................. 320/106
See application file for complete search history.

(56) References Cited

U.S. PATENT DOCUMENTS

2004/0185917 A1*    9/2004    Fischedick et al. .......... 455/574
2004/0217865 A1*    11/2004    Turner .................... 340/572.7

FOREIGN PATENT DOCUMENTS

KR    1020060068119    6/2006

* cited by examiner

*Primary Examiner*—Edward Tso
*Assistant Examiner*—Johali A Torres Ruiz
(74) *Attorney, Agent, or Firm*—Cantour Colburn LLP

(57) ABSTRACT

Disclosed herein is a genuine product battery identification system for mobile devices. A tag for identifying whether a battery is a genuine product battery is included a battery, and a reader for transmitting and receiving radio frequency information is included in a mobile device body. When the battery is mounted in the mobile device body, the mobile device is operated with power supplied from the battery, and the genuine product battery identification system determines whether the battery is a genuine product battery through radio frequency. When it is determined that the battery is the genuine product battery, power is continuously received from the battery to the mobile device, by which the mobile device is normally operated. When it is determined that the battery is not the genuine product battery, on the other hand, the reception of power from the battery to the mobile device is interrupted, whereby problems caused due to the use of a non-genuine product battery are fundamentally solved.

10 Claims, 6 Drawing Sheets

SYSTEM FOR IDENTIFICATION OF GENUINE BATTERY PRODUCT IN MOBILE DEVICE

FIELD OF THE INVENTION

The present invention relates to a genuine product battery identification system constructed such that a mobile device can be operated only with a genuine product battery, and, more particularly, to a genuine product battery identification system comprising a tag included in a battery, which is used to identify whether the battery is a genuine product battery, the tag having a radio frequency identification (RFID) antenna, preferably, disposed on a protection circuit board of the battery, and a reader mounted in a device body for identifying the tag and allowing the mobile device to be operated only when the battery is a genuine product battery.

BACKGROUND OF THE INVENTION

Recent important trends in electronic industries are increase of wireless and mobile devices and conversion from analog to digital. Rapid popularization of wireless telephone (mobile phones) and laptop computers and conversion from analog cameras to digital cameras are representative examples of the trends.

In company with the above-mentioned trends, much research and development on secondary batteries as a power source for the devices has been carried out. One of the secondary batteries is a lithium secondary battery, which uses lithium transition metal oxide or lithium composite oxide as cathode active material, and has a high output and capacity to weight ratio, whereby the lithium secondary battery is in the spotlight. The lithium secondary battery is constructed in a structure in which an electrode assembly, which is constructed in a cathode/a separator/an anode structure, is mounted in a sealed case together with an electrolyte. However, the lithium secondary battery has problems in that the lithium secondary battery may catch fire or explode due to overcharge, overdischarge, overcurrent, or external impacts, i.e., the lithium secondary battery has low safety.

In order to solve the problems, the secondary battery is provided with various safety elements. For example, a protection circuit module (PCM), which interrupts supply of electric current at the time of overcharge, overdischarge, or overcurrent so as to secure the safety of the battery, is connected between a battery cell and external input and output terminals. The use of such safety elements is one of major factors increasing the manufacturing costs of the battery.

As a result, non-genuine product batteries have been increasingly used. In the case of batteries having no safety elements, however, there is a high possibility of danger in that the batteries can catch fire or explode due to the abnormal operation of the batteries. It has been occasionally reported that non-genuine product batteries have exploded during the use of devices while the non-genuine product batteries were mounted in the devices. Consequently, a method or system for identifying genuine product batteries, i.e., batteries having all elements necessary to secure the operation and the safety of the batteries, is required. However, it becomes more difficult to distinguish appearance between genuine product batteries and non-genuine product batteries due to development of an imitation technology.

Meanwhile, in connection with the product identification, there has been widely used in recent years a technology of identifying data stored in a tag having a microchip mounted therein using radio frequency in a non-contact fashion, which is a kind of automatic identification and data capture (AIDC) technology, in distribution and logistics applications. Radio frequency identification (RFID) is a kind of AIDC technology, which reads data from a tag, a card, or a label having a microchip mounted therein using radio frequency in a non-contact fashion. The RFID system is a radio frequency system comprising a tag semiconductor chip, an antenna, and a reader (an identifier).

Product information of a product, to which the tag is attached, is stored in the semiconductor chip. The antenna transmits the information by a distance of a few meters to dozens of meters in the form of radio frequency. The reader receives the signal to decode the product information and transmits the decoded product information to a predetermined system, such as a computer. Consequently, all products having a tag attached thereto can be automatically identified or tracked anywhere at any time.

The RFID can be accurately classified based on classification criteria, such as whether power is supplied or not, frequency band, and communication connection. Depending upon whether power is supplied or not, the tag may be classified as an active tag or a passive tag. The active tag has advantages in that the active tag uses a built-in battery, has readable/writable memories of various sizes, and has a long-distance (30 to 100 m) data exchange range. On the other hand, the passive tag has advantages in that, the passive does not require supply of external power, whereby the structure of the passive tag is relatively simple, the manufacturing costs of the passive tag is low, and the passive tag has a semi-permanent service life. However, the memory of the passive tag is a read only memory, and the passive tag requires a high-output reader. Consequently, the passive tag is used in small-unit applications.

Depending upon the frequency band, the tag may be classified as a high frequency tag or a low frequency tag. The low frequency tag uses a frequency of 30 to 500 KHz with the result that the readable distance of the low frequency tag is short. Consequently, the low frequency tag is usually utilized in security, proper management, and genuine product identification applications. On the other hand, the high frequency tag uses a frequency of 860 to 960 MHz or 2.45 GHz with the result that the readable distance of the low frequency tag is long, for example, 30 m or more. Consequently, the low frequency tag is usually utilized in railroad, logistics, and distribution applications.

SUMMARY OF THE INVENTION

Therefore, the present invention has been made to provide an identification system for identifying a genuine product in a mobile device through the use of a radio frequency identification (RFID) technology.

Specifically, it is an object of the present invention to provide a genuine product battery identification system for identifying whether a battery having a tag included therein is a genuine product battery through the radio frequency in a device body, and, only when it is identified that the battery is the genuine product battery, allowing a device to be normally operated with power supplied from the battery.

It is another object of the present invention to provide a genuine product battery identification system wherein an RFID antenna occupying a large portion of the tag when the tag is included in the battery is constructed such that the RFID antenna can be efficiently mounted in an interior space of the battery.

It is yet another object of the present invention to provide a method of operating the genuine product battery identification system.

In accordance with one aspect of the present invention, the above and other objects can be accomplished by the provision of a genuine product battery identification system for mobile devices, comprising: a battery including a tag, which has an antenna for transmitting and receiving radio frequency, a database for storing product information, and a control unit for controlling the transmission and reception of information between the antenna and the database; and a mobile device body including a reader, which has an antenna for transmitting and receiving radio frequency, a database for storing genuine product battery identification information, and a control unit for controlling the transmission and reception of information between the antenna and the database and controlling supply or interruption of power from the battery.

Consequently, when the battery is mounted in the mobile device body, the mobile device is operated with power supplied from the battery, and the genuine product battery identification system according to the present invention determines whether the battery is a genuine product battery through radio frequency. When it is determined that the battery is the genuine product battery, power is continuously received from the battery to the mobile device, by which the mobile device is normally operated. When it is determined that the battery is not the genuine product battery, on the other hand, the reception of power from the battery to the mobile device is interrupted, whereby problems caused due to the use of a non-genuine product battery are fundamentally solved.

The mobile device body is a structure that can be operated with power supplied from the battery. For example, the mobile device body may be a mobile phone, a camera, a personal digital assistant (PDA), or a laptop computer, although the mobile device body is not particularly restricted.

The battery is, preferably, a secondary battery, more preferably, a lithium secondary battery. The secondary battery can be applied to present invention irrespective of its shape. The secondary battery includes a battery cell having an electrode assembly, which is constructed in a cathode/a separator/an anode structure, mounted in a case together with an electrolyte in a sealed state, and a protection circuit module (PCM) mounted or attached to the battery cell.

The antenna of the battery may be an RFID antenna for transmitting and receiving radio frequency. Preferably, the antenna of the battery is a loop-type antenna. Due to the miniaturization of mobile devices, it is strongly required for the battery to be lightweight, thin, short, and small. For this reason, it is difficult to mount the loop-type antenna in a restricted interior space of the battery. Specifically, the placement of the loop-type antenna greatly increases the size of the battery. Furthermore, the placement of the loop-type antenna in the battery, in which a large number of parts are mounted in a compact fashion, requires very skilled techniques. Also, an apparatus for performing the placement of the loop-type antenna in the battery must have a high-precision structure.

Consequently, in a preferred embodiment of the present invention, the loop-type antenna may be integrally formed with a protection circuit module, which includes a protection circuit board and connecting terminals, by insert injection molding, while the loop-type antenna is electrically connected to the protection circuit module, so as to constitute a green-body cap assembly. This technology is disclosed in detail in Korean Patent Application No. 2004-106712, which has been filed in the name of the applicant of the present patent application. The disclosure of the above-mentioned patent application is hereby incorporated by reference as if fully set forth herein.

In a further preferred embodiment of the present invention, the loop-type antenna may be mounted to the protection circuit board in the form of a chip, or may be patterned on the protection circuit board.

The product information stored in the database of the battery is data for identifying whether the battery used is a genuine product battery. The product information may be a serial number assigned by a battery manufacturing company or an inherent genuine product identification number provided from the battery manufacturing company to a device manufacturing company through a secret route. The product information is not particularly restricted so long as it can be identified whether the battery is a genuine product battery based on the product information.

The control unit of the battery controls the product information of the database to be modulated into a transmittable signal depending upon a command signal received from the antenna and the modulated signal to be retransmitted to the device body.

The tag of the battery, which includes the antenna, the database, and the control unit, may be a passive tag or an active tag. When the tag is the passive tag, power is supplied from the device to the tag in a wireless fashion such that the tag can be operated. When the tag is the active tag, power is supplied from the battery cell to the tag such that the tag can be operated. In the case that the tag is the passive tag, the device body further includes a wireless communication unit for transmitting power to the tag.

The device body includes the reader, which comprises the antenna, the database, and the control unit, which were previously described, in addition to a system related to the operation of the device itself.

Outer or inner antenna already mounted in connection with the operation of the mobile device itself may be used as the antenna of the device body. Also, microchips already mounted in connection with the operation of the mobile device itself may be used as the database and the control unit of the device body. Consequently, the reader for genuine product identification may be included in the existing hardware of the mobile device body as software, and therefore, no additional space or apparatus is needed. According to circumstances, however, components necessary as the reader for genuine product identification may be additionally included, and therefore, the scope of the present invention is not restricted to a specific method or a specific structure.

According to circumstances, information transmitted and received between the tag and the reader may be encoded in order to prevent forgery of the tag attached to the battery. In this case, the tag of the battery and the reader of the device body further include an encoding and decoding unit for encoding and decoding information. Data encoding is not particularly restricted. For example, a symmetrical key encoding method or an asymmetrical key encoding method may be applied.

In accordance with another aspect of the present invention, there is provided a method of operating the genuine product battery identification system.

According to the present invention, the genuine product battery identification system may be operated as follows. First, when the battery is mounted in the device body, the control unit of the device body transmits a radio frequency signal for requesting product information through the antenna so as to identify the product information of the battery. The power necessary to perform this operation is supplied from the battery. Even when the battery is not a genuine product battery, the safety-related problems of the battery are not caused during the initial operation of the battery. Consequently, the operation of the device body to identify whether the battery is a genuine product battery is performed with the power supplied from the battery. The signal is received by the antenna of the battery, and the control unit extracts product information stored in the database, modulates the extracted product information, and transmits the modulated product information to the device body through the antenna. The received data signal is modulated into a signal that can be processed through the control unit of the device body, the control unit extracts information for genuine product battery identification stored in the database so as to determine whether the product information received from the battery corresponds to the extracted information for genuine product battery identification. The determination for genuine product identification may be performed in various manners. When it is determined that the battery is a genuine product battery, the system is set such that power can be continuously supplied from the battery. When it is determined that the battery is not a genuine product battery, on the other hand, the fact that the battery is not the genuine product battery is displayed in the form of video information or audio information, and the reception of power from the battery is interrupted.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF MAIN REFERENCE NUMERALS OF THE DRAWINGS

Figure 1:
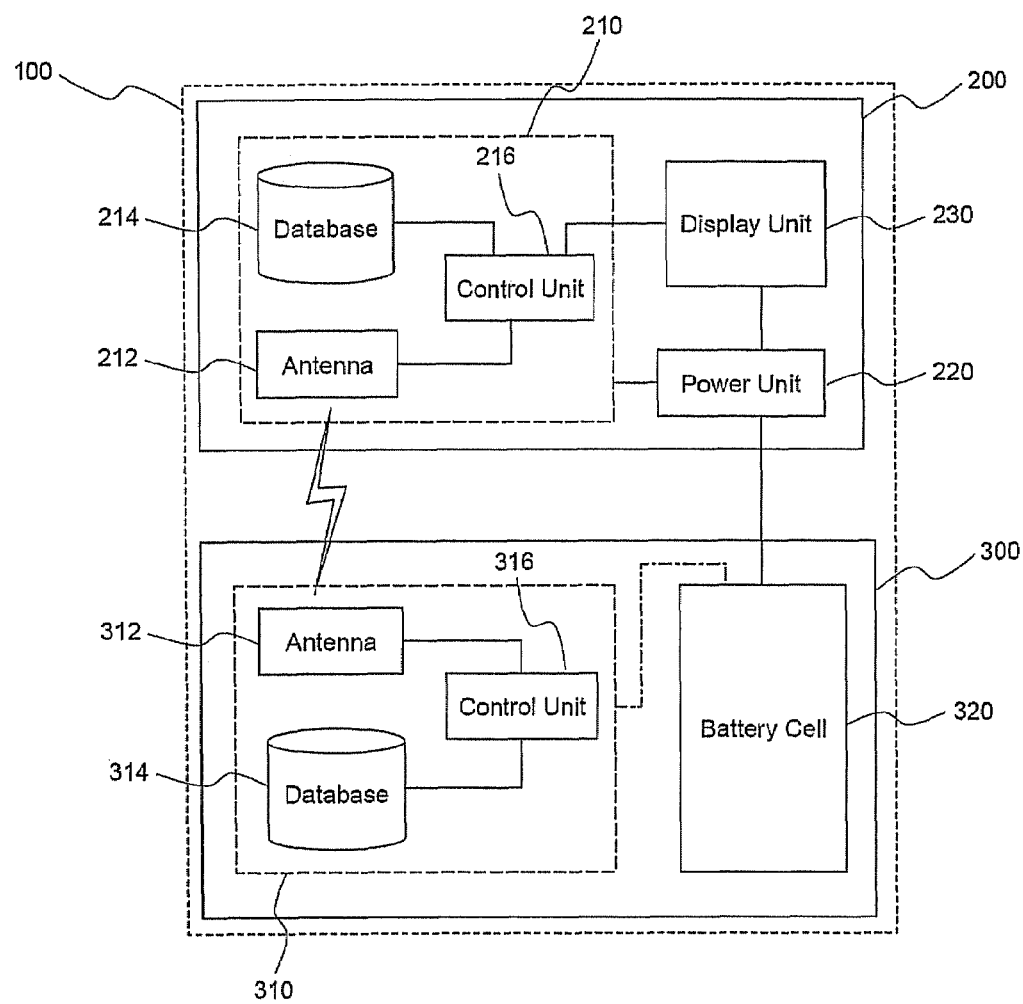
FIG. 1 is a typical block diagram illustrating an exemplary genuine product battery identification system according to the present invention.

100: genuine product battery identification system
200: device body 210: reader
300: battery 310: tag
400: protection circuit module 500: RFID antenna

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

FIG. 1 is a typical block diagram illustrating an exemplary genuine product battery identification system according to the present invention. For convenience of clear understanding, many components of a device body and a battery are omitted.

Referring to FIG. 1, a genuine product battery identification system 100 for mobile devices comprises: a reader 210, which is mounted in a device body 200, including an antenna 212, a database 214, and a control unit 216; and a tag 310, which is mounted in a battery 300, including an antenna 312, a database 314, and a control unit 316.

As shown in FIG. 1, the battery 300 is mounted in the device body 200 (the battery 300 is electrically connected to the device body 200). While the battery 300 is mounted in the device body 200, the device body 200 is operated by a power unit 220, which is electrically connected to the battery 300, irrespective of whether the battery 300 is a genuine product battery or not. Consequently, other components of the device body 200, such as a display unit 230, are operated with power supplied from the battery 300.

The reader 210 includes the antenna 212, which transmits and receives radio frequency data, the database 214, in which genuine product battery identification information is stored, and the control unit 216, which controls the transmission and reception of the radio frequency data and the operation of the power unit 200. The control unit 216 also controls the operation of the display unit 230 so that identification as to whether the battery is a genuine product battery can be displayed to a user. Various kinds of information, such as video information and audio information, may be displayed through the display unit 230. The database 214 and the control unit 216 of the reader 210 may be separately mounted in the device body 200 in the form of a microchip. Alternatively, the database 214 and the control unit 216 of the reader 210 may be included in the existing hardware of the device body 200 in the form of software.

The tag 310, which transmits and receives information to and from the reader 210 of the device body 200, includes the antenna 312, which transmits and receives radio frequency data, the database 314, in which product information is stored, and the control unit 216, which controls the transmission and reception of the radio frequency data. In the case that the tag 310 is an active tag, the tag 310 may be constructed such that the tag 310 can be operated with power supplied from a battery cell 320 (see a dashed dot line). The database 314 and/or the control unit 316 may be included in the battery in the form of a microchip. Alternatively, the database 314 and/or the control unit 316 may be included as circuits on a protection circuit board.

Other components may be added or the above-described construction may be partially modified so long as the effects of the present invention are not deteriorated, and such addition and modification are must be interpreted to be within the scope of the present invention.

Figure 2:
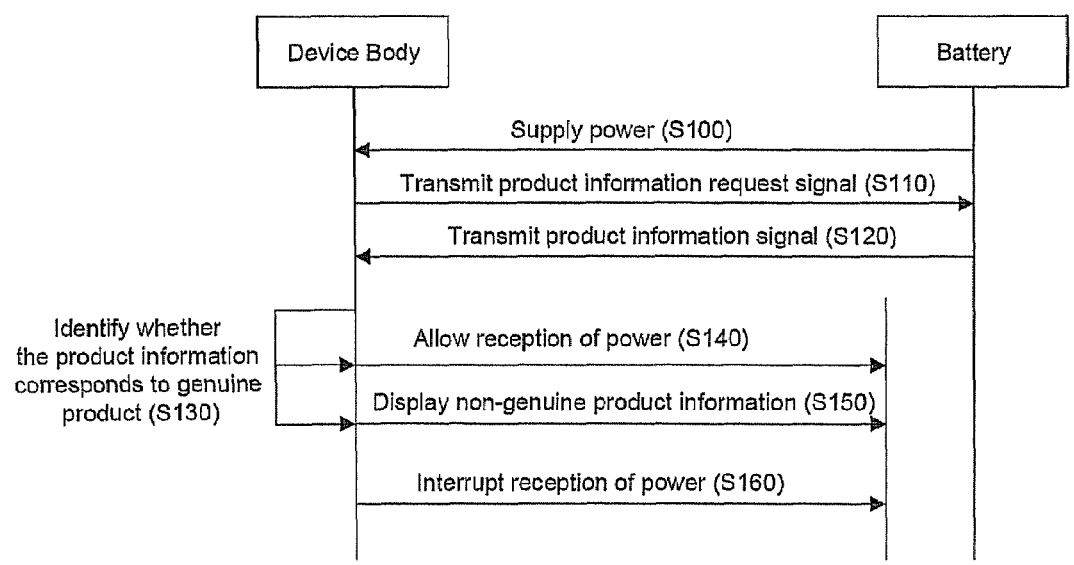
FIG. 2 is a view illustrating an exemplary operation of the genuine product battery identification system shown in FIG. 1.

FIG. 2 is a view illustrating an exemplary operation of the genuine product battery identification system shown in FIG. 1.

When the battery is mounted in the device body as shown in FIG. 1, power is supplied from the battery to the device body with the result that the device body is operated (S100). Also, the reader of the device body is operated to transmit a product information request signal in the form of radio frequency (S110). The product information request signal is received by the antenna of the battery, and the control unit of the battery modulates product information stored in the database into a radio frequency signal, and transmits the radio frequency signal through the antenna (S120). The reader of the device body receives the radio frequency signal, and the control unit of the device body identifies whether the product information received from the tag is correct (i.e., the product information received from the tag is genuine indication information) based on genuine product identification information stored in the database (S130). When it is determined that the battery is a genuine product battery as a result of the identification, the control unit of the device body commands the power unit to continuously receive power (S140). When it is determined that the battery is not a genuine product battery (including the case that no reply signal is received even through a predetermined period of time has passed), on the other hand, the control unit of the device body controls the display unit such that a user can be informed of a message that the battery is not a genuine product battery through the display unit (S150), and commands the power unit to interrupt the reception of power (S150) such that the device body cannot be operated any longer with the currently mounted battery.

Figure 3:
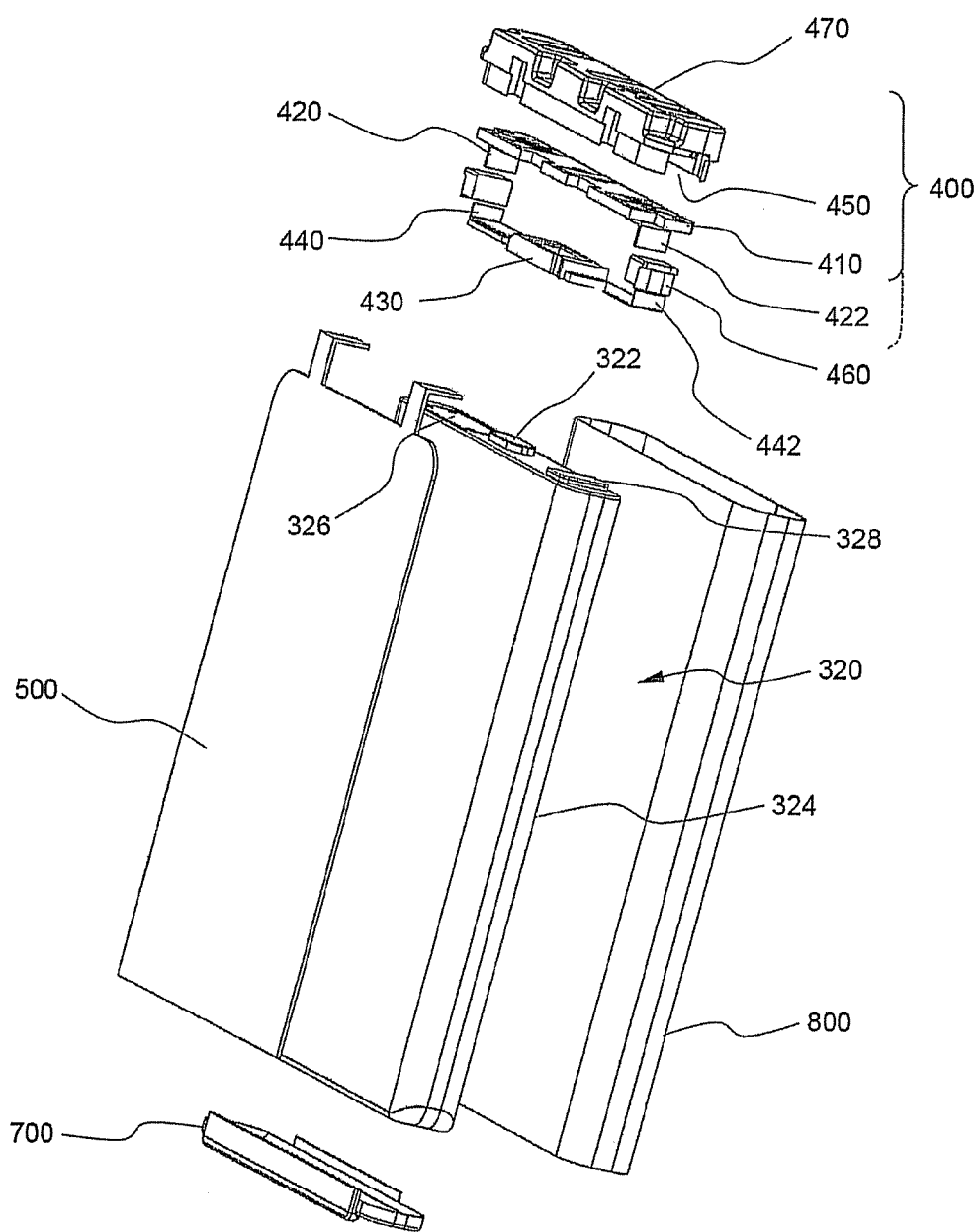
FIG. 3 is an exploded perspective view illustrating a battery including a loop-type radio frequency identification (RFID) antenna according to a preferred embodiment of the present invention.
Figure 4:
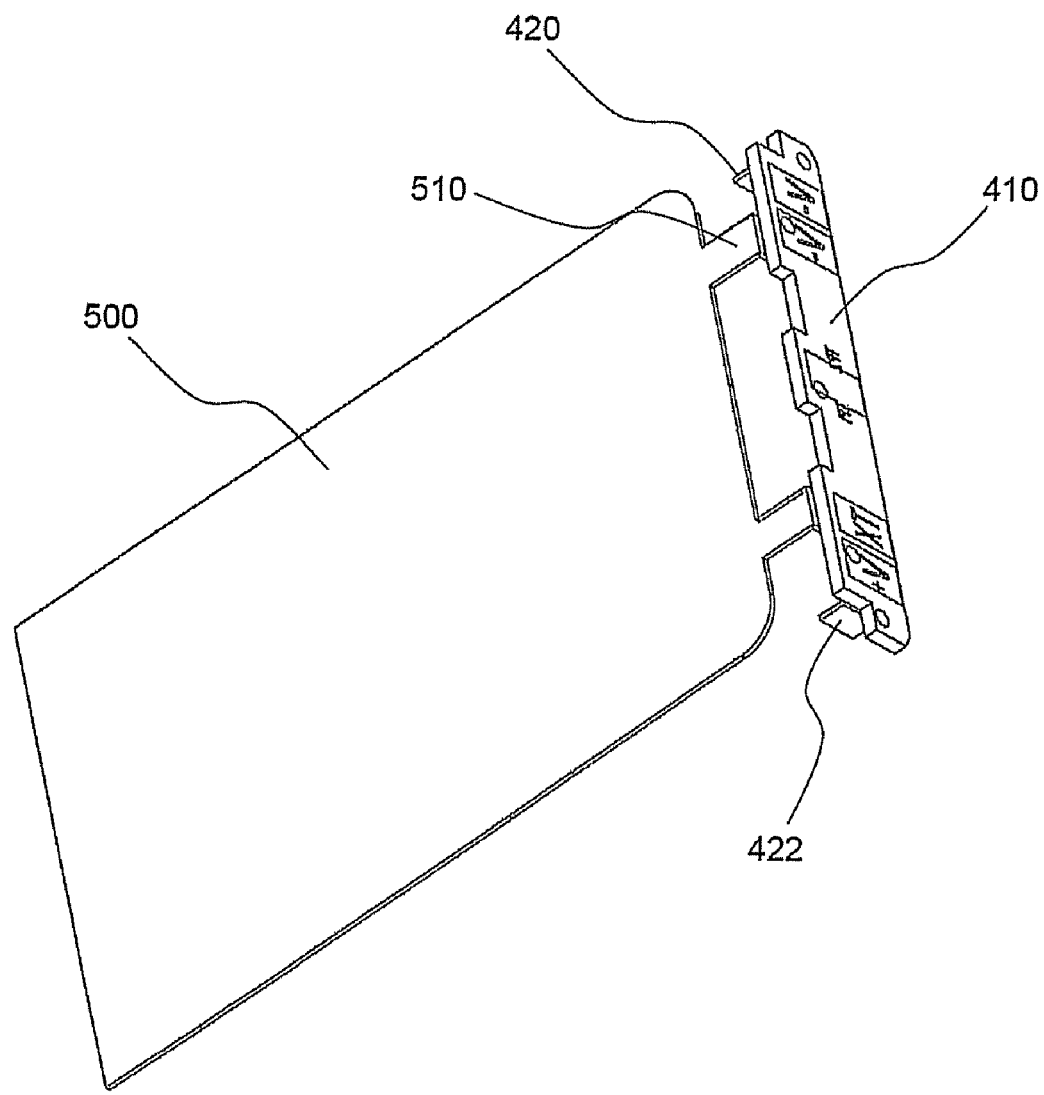
FIG. 4 is a perspective view illustrating the coupling of the loop-type antenna and the connecting terminals to the protection circuit board shown in FIG. 3.
Figure 5:
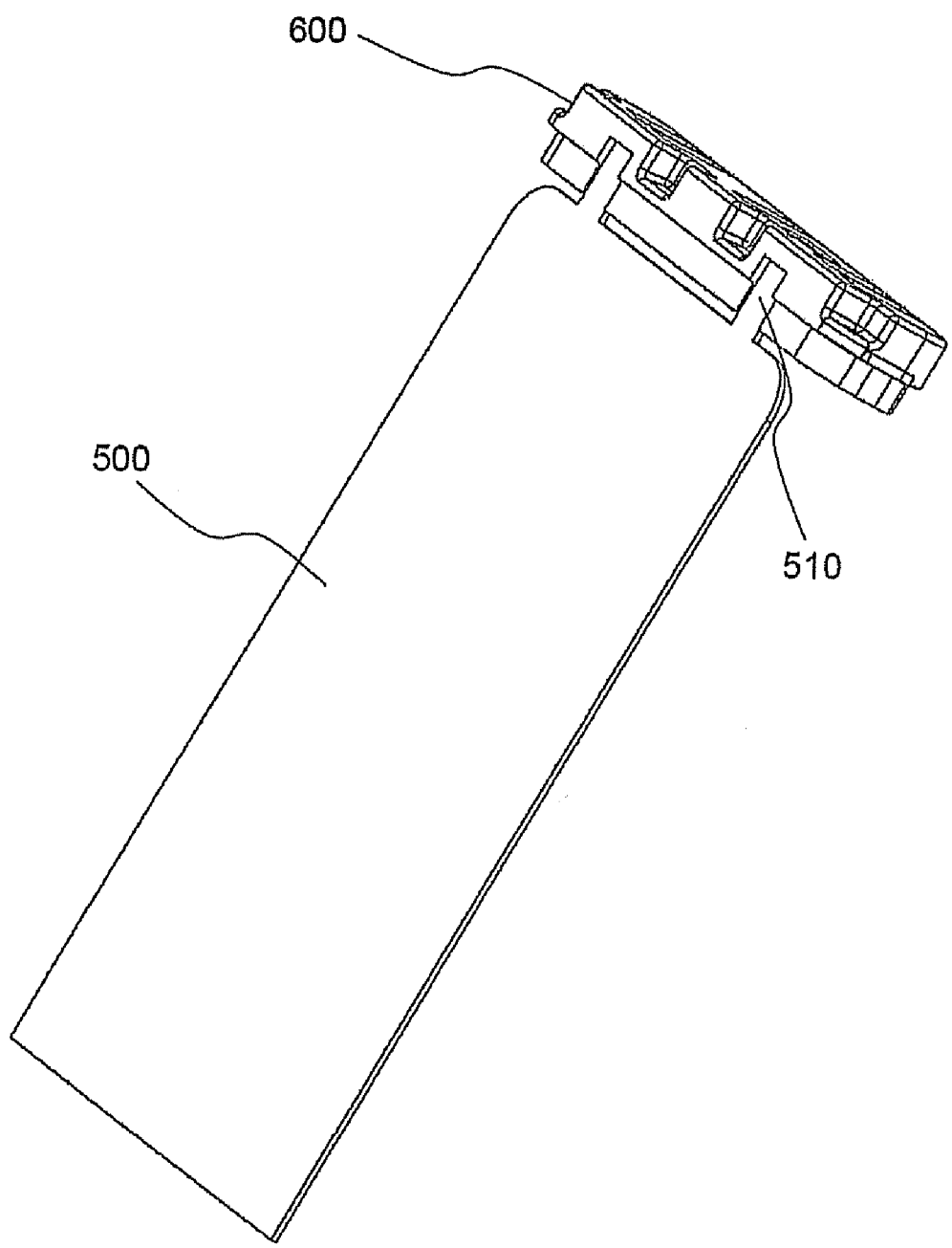
FIG. 5 is a perspective view illustrating a green-body cap assembly manufactured by forming the loop-type antenna and the protection circuit module shown in FIG. 4 using an insert injection molding method.

FIGS. 3 to 5 illustrates, in typical views, that a loop-type antenna of the tag is formed together with a protection circuit module by insert injection molding according to a preferred embodiment of the present invention so as to constitute a part of a green-body cap assembly.

Referring first to FIG. 3, a battery 300 comprises: a battery cell 320 having an electrode assembly (not shown), which consists of a cathode, an anode, and a separator, mounted therein together with an electrolyte; a protection circuit module 400, which includes a protection circuit board 410, connecting terminals 420 and 422, and a positive temperature coefficient (PTC) block 430; and a loop-type radio frequency identification (RFID) antenna 500. The loop-type antenna 500 is coupled to the protection circuit module 400 such that the loop-type antenna 500 is electrically connected to the protection circuit module 400.

The battery cell 320 is constructed such that one of the electrodes (for example, the anode) of the electrode assembly, which is mounted in the battery cell 320 in a sealed state, is connected to a protruding terminal 322 formed at the center of the upper end of the battery cell 320, and the other electrode (for example, the cathode) of the electrode assembly is directly connected to a conductive battery case 324, which serves as a terminal.

The loop-type antenna 500, and the protection circuit module 400, and the cap housing 470 are integrally formed, by insert injection molding, to constitute a cap assembly. The protection circuit module 400 includes the protection circuit board 410, on which a protection circuit is basically formed, and the connecting terminals 420 and 422. As occasion demands, the PTC block 430 and/or leads 440 and 442 may be included in the protection circuit module 400.

In the case that the PTC block 430 and the leads 440 and 442 are not included in the green-body cap assembly, the loop-type antenna 500, the connecting terminals 420 and 422, and the protection circuit board 410 are placed in a predetermined mold (not shown), and molten resin is poured into the mold such that the loop-type antenna 500, the connecting terminals 420 and 422, and the protection circuit board 410 can be integrally formed with the cap housing 470.

As shown in FIG. 4, the loop-type antenna 500 and the connecting terminals 420 and 422 are coupled to the protection circuit board 410 so as to manufacture the green-body cap assembly. Extensions 510 of the loop-type antenna 500 may be coupled to the protection circuit board 410, for example, by welding, and the connecting terminals 420 and 422 may also be coupled to the protection circuit board 410, for example, by welding. According to circumstances, the loop-type antenna 500 and the connecting terminals 420 and 422 may be temporarily coupled to each other by means of an appropriate coupling member.

The protection circuit board 410, to which the loop-type antenna 500 and the connecting terminals 420 and 422 are coupled, is formed in the predetermined mold by insert injection molding, whereby a green-body cap assembly 600 as shown in FIG. 5 is manufactured. It can be seen from the drawing that the extensions 510 of the loop-type antenna 500 are integrally coupled to the green-body cap assembly 600, and, although not shown in the drawings, the connecting terminals are partially exposed from the lower end surface of the green-body cap assembly 600. The process of assembling the cap assembly 600 to the battery cell will be described below with reference to FIG. 3.

Referring back to FIG. 3, a conductive member 326 having excellent adhesion, such as a nickel clad member, is attach to one side of the upper end surface of the battery cell 320, and an insulative member 328 is attached to the other side of the upper end surface of the battery cell 320. The cathode lead 440 is coupled to the conductive member 326. Afterward, the cathode lead 440 is coupled to the cathode connecting terminal 420 of the protection circuit module 400. On the other hand, the PTC block 430 is coupled to the protruding anode terminal 322, and the anode lead 442 is coupled to the extension of the PTC block 430. Afterward, the anode lead 442 is coupled to the anode connecting terminal 422 of the protection circuit module 400. Preferably, the coupling between the conductive member 326 and the cathode lead 440 and the coupling between the PTC block 430 and the anode lead 442 are accomplished by spot welding. At the upper end of the battery, to which the leads 440 and 442 are coupled, is mounted the green-body cap assembly 600 (see FIG. 5), which is constituted by integrally forming the loop-type antenna 500, the protection circuit board 410, and the cap housing 470, while the connecting terminals 420 and 422 are partially exposed from the lower end surfaces of the leads 440 and 442.

While the green-body cap assembly is mounted as described above, the connecting terminal 422 and the lead 442 are coupled to each other by welding through an opening 45 formed at the side of the green-body cap assembly, and then the opening 450 is covered by a side cap 460, whereby the upper part of the battery is constructed. After that, a lower cap 700 is coupled to the battery cell 320, and then a wrapping member 800 is applied to the outer surface of the battery cell 320. As a result, the battery 300 is completed.

Figure 6:
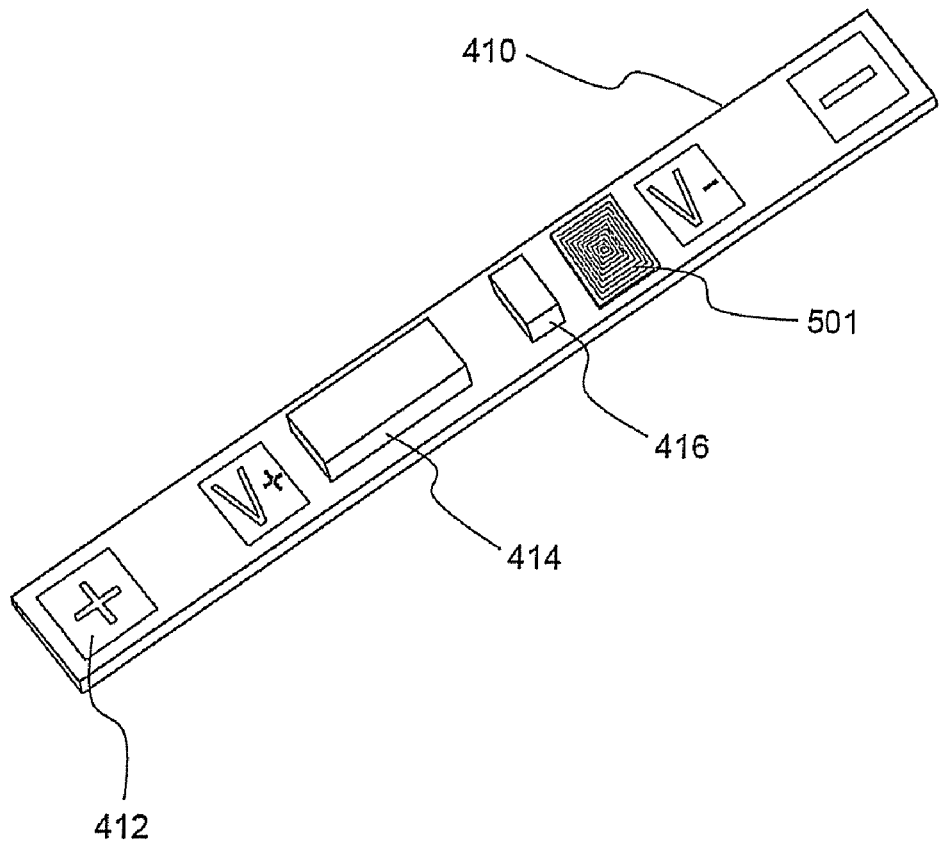
FIG. 6 is a perspective view illustrating a loop antenna patterned on one side surface of a protection circuit board (PCB) according to a preferred embodiment of the present invention.
Figure 7:
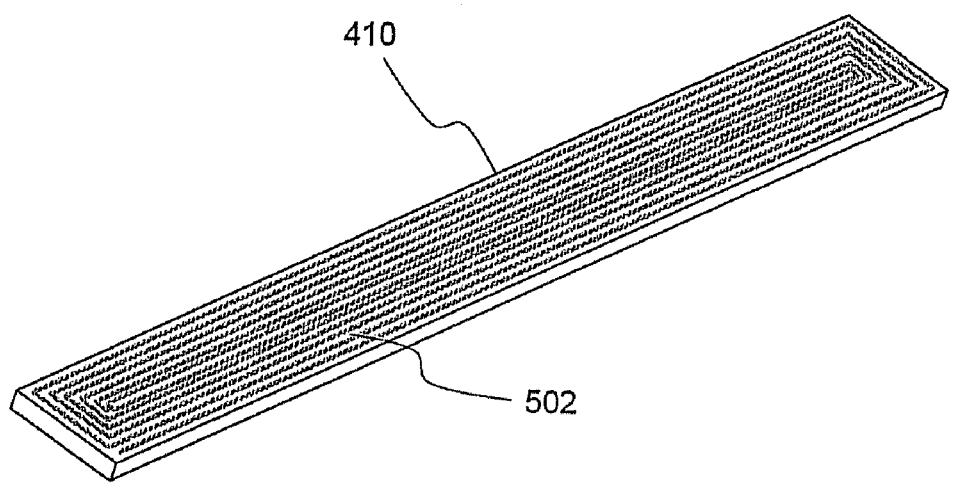
FIG. 7 is a perspective view illustrating a loop antenna patterned on the front surface of the PCB according to another preferred embodiment of the present invention.

FIGS. 6 and 7 are typical views respectively illustrating loop antennas of the tag patterned on the board of the protection circuit module according to preferred embodiments of the present invention.

Referring to these drawings, an external input and output terminal 412 is formed at the upper end of the plate-shaped protection circuit board 410. On the upper end of the plate-shaped protection circuit board 410 is printed a protection circuit (not shown) for controlling overcharge, overdischarge, and overcurrent. In addition, various safety elements 416 are mounted to the upper end of the plate-shaped protection circuit board 410. Also, the loop antenna 501; 502 is partially or entirely patterned on the upper end surface or the lower end surface of the protection circuit board 410. The loop antenna 501; 502 may be printed to the protection circuit board 410 simultaneously when the protection circuit is printed to the protection circuit board 410, before the protection circuit is printed to the protection circuit board 410, or after the protection circuit is printed to the protection circuit board 410. Since the loop antenna 501; 502 is patterned on the protection circuit board 410, no additional space for mounting the loop antenna 501; 502 is needed.

The database 314 and the control unit 316 shown in FIG. 1 may be mounted to the protection circuit board 410 in the form of an additional microchip, or may be mounted in the protection circuit board 410 in the form of a circuit.

The protection circuit board 410 may be electrically mounted or attached to a body for secondary batteries having various structures.

Although the preferred embodiments of the present invention have been disclosed for illustrative purposes, those skilled in the art will appreciate that various modifications, additions and substitutions are possible, without departing from the scope and spirit of the present invention as disclosed in the accompanying claims.

INDUSTRIAL APPLICABILITY

As apparent from the above description, the genuine product battery identification system according to the present invention identifies whether the battery used is a genuine product battery through radio frequency. When the battery used is the genuine product battery, the device body continuously receives power from the battery, and therefore, the device body is normally operated. On the other hand, when the battery used is not the genuine product battery, the supply of power from the battery to the device body is interrupted. Consequently, problems caused due to the use of a non-genuine product battery are fundamentally solved. Furthermore, in the case that the RFID antenna is mounted to the protection circuit board in the form of a chip, or is patterned on the protection circuit board in the form of a circuit, it is possible to construct a tag without increasing the volume of the battery, and therefore, it is possible to manufacture a battery having a compact structure.

What is claimed is:

1. A genuine product battery identification system for mobile devices, comprising:
   a battery including a tag, which has an antenna for transmitting and receiving radio frequency, a database for storing product information, and a control unit for controlling the transmission and reception of information between the antenna and the database; and
   a mobile device body including a reader, which has an antenna for transmitting and receiving radio frequency, a database for storing genuine product battery identification information, and a control unit for controlling the transmission and reception of information between the antenna and the database and controlling supply or interruption of power from the battery.

2. The system according to claim 1, wherein the mobile device body is a mobile phone, a camera, a personal digital assistant (PDA), or a laptop computer.

3. The system according to claim 1, wherein the battery is a lithium secondary battery.

4. The system according to claim 1, wherein the antenna of the battery is a loop-type antenna.

5. The system according to claim 4, wherein the loop-type antenna is integrally formed with a protection circuit module, which includes a protection circuit board and connecting terminals, by insert injection molding, while the loop-type antenna is electrically connected to the protection circuit module, so as to constitute a green-body cap assembly.

6. The system according to claim 4, wherein the loop-type antenna is mounted to the protection circuit board in the form of a chip, or is patterned on the protection circuit board.

7. The system according to claim 1, wherein the tag is a passive tag or an active tag.

8. The system according to claim 7, wherein the tag is the passive tag, and the device body further includes a wireless communication unit for transmitting power to the tag.

9. The system according to claim 1, wherein the tag and the reader further include an encoding and decoding unit for encoding and decoding information.

10. A method of operating the genuine product battery identification system according to claim 1, wherein
   when the battery is mounted in the device body, the control unit of the device body transmits a radio frequency signal for requesting product information through the antenna so as to identify the product information of the battery;
   the antenna of the tag receives the signal, and the control unit of the tag extracts product information stored in the database, modulates the extracted product information, and transmits the modulated product information to the device body through the antenna;
   the received data signal is modulated into a signal that can be processed through the control unit of the device body, the control unit of the device body extracts information for genuine product battery identification stored in the database so as to determine whether the product information received from the battery corresponds to the extracted information for genuine product battery identification;
   when it is determined that the battery is a genuine product battery, the system is set such that power can be continuously supplied from the battery, and, when it is determined that the battery is not a genuine product battery, the fact that the battery is not the genuine product battery is displayed in the form of video information or audio information, and the reception of power from the battery is interrupted.

* * * * *